Patented Feb. 9, 1943

2,310,762

UNITED STATES PATENT OFFICE 2,310,762

PRODUCTION OF AROMATIC VINYL COMPOUNDS

Guenther Daumiller and Gunthard Hoffmann, Ludwigshafen-on-the-Rhine, Germany; vested in the Alien Property Custodian No Drawing. Application August 9, 1940, Serial No. 352,006. In Germany August 9, 1939

3 Claims. (Cl. 260—669)

The present invention relates to the production of aromatic vinyl compounds.

It has been found that aromatic vinyl compounds can be obtained in very simple manner if carboxylic esters of aryl-substituted aliphatic alcohols with at least two carbon atoms are subjected to high temperatures. Thus is formed beside the vinyl compound the free carboxylic acid whose aralkyl ester was used as starting material.

The process is especially adapted to the production of unsubstituted vinyl compounds of mono-nuclear aromatic hydrocarbons, for example, styrene. The starting materials are obtained, for example, by esterifying a phenylethyl alcohol with a carboxylic acid, suitably a lower molecular aliphatic acid, such as formic acid, acetic acid, or propionic acid. The conversion into the vinyl compounds is appropriately effected by conducting the vapors of the carboxylic acid aralkyl esters through empty tubes, heated to about 500–700° C., which are made of materials resistant to carboxylic acids, for example, quartz, copper-manganese or a suitable iron-nickel or iron-chromium alloy. The conversion proceeds so smoothly and rapidly that very great amounts of carboxylic acid aralkyl esters can be reacted in relatively small reaction vessels. Since the reaction is exothermic, it is recommended that the raw material be preheated almost up to the conversion temperature before it is sent through the reaction vessel.

The conversion can also be carried out in contact with solid dehydrating catalysts, for example, active alumina or silica gel; however, these offer no especial advantage over working in empty vessels. Also, the simultaneous employment of inert diluent gases or vapors is feasible.

The reaction can easily be controlled through maintaining a definite gas velocity at a given temperature, so that the conversion of the esters into vinyl compounds is nearly quantitative. Unreacted ester can again be employed in the reaction, while the carboxylic acids arising from the splitting can again be employed for the production of the carboxylic acid aralkyl esters.

Example

Through a copper-manganese tube of 3 centimeters inside diameter, which is so heated to 580° C. that the heated space amounts to about 350 cubic centimeters, is led hourly the vapor of 1000 grams phenylethyl acetate. The gases leaving the tube are cooled and separated into individual constituents, 90 per cent of the phenylethyl acetate processed is converted into styrene, while 7 per cent of the phenylethyl acetate is recovered unchanged.

If one works under otherwise similar conditions at 600° C., the yield of styrene amounts to above 90 per cent with a conversion of 98 per cent of the phenylethyl acetate processed.

What is claimed is:

1. The process for the production of styrene which comprises subjecting a carboxylic acid ester of phenylethyl alcohol to a temperature of from about 500° C. to about 700° C.

2. The process for the production of styrene which comprises passing phenylethyl acetate vapor through a confined reaction space at a temperature of from about 500° C. to about 700° C.

3. The process for the production of styrene which comprises subjecting vaporized phenylethyl acetate to a temperature of about 580° C., the time of reaction being regulated so that about 1000 grams phenylethyl acetate per hour per 350 cubic centimeters reaction space is processed.

GUENTHER DAUMILLER.
GUNTHARD HOFFMANN.